Figure 4:
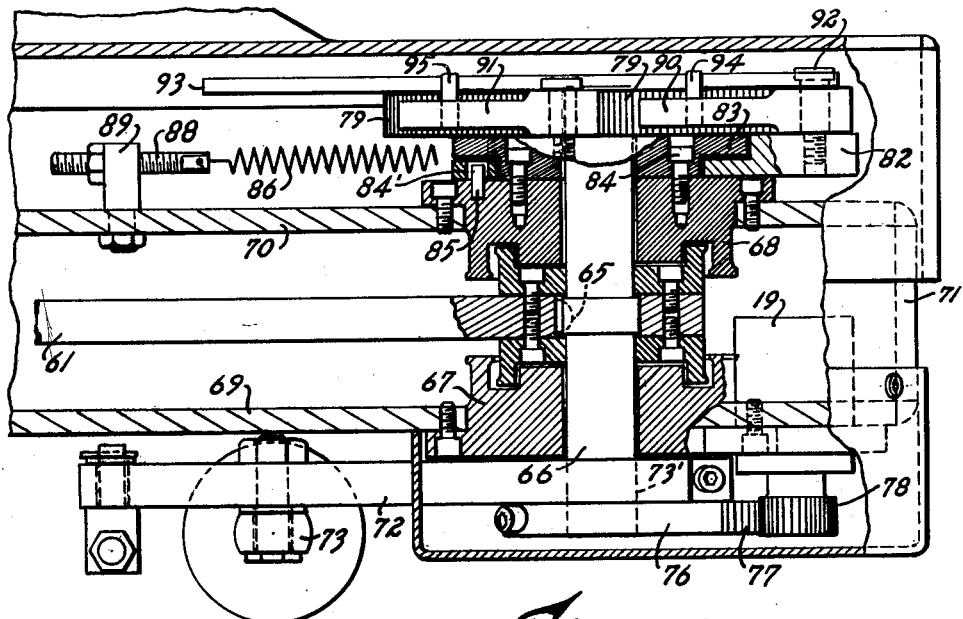

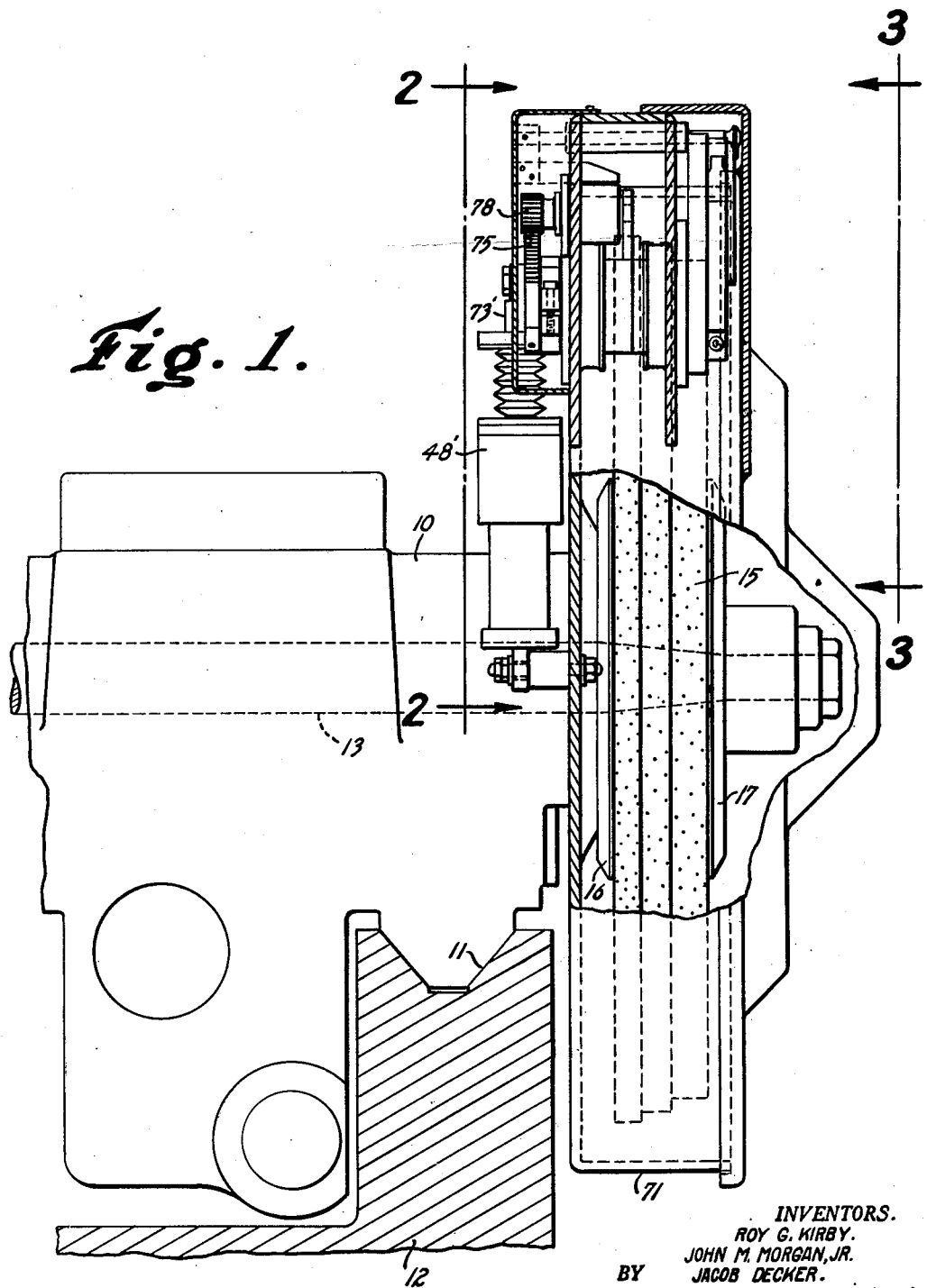

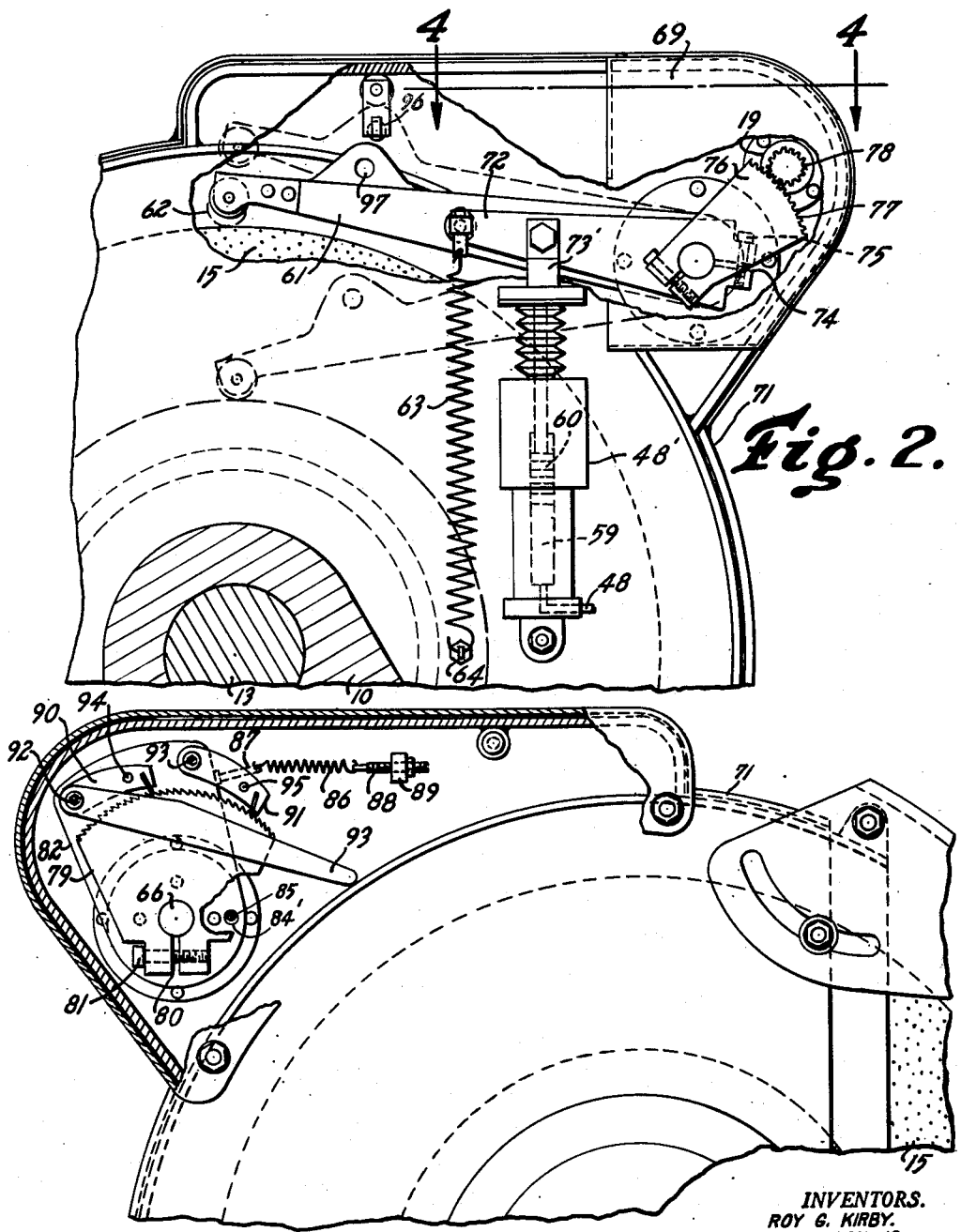

INVENTORS.
ROY G. KIRBY.
JOHN M. MORGAN, JR.
JACOB DECKER.
BY H. K. Parsons + C. W. Wright
ATTORNEYS Patented June 16, 1953

2,641,875

UNITED STATES PATENT OFFICE 2,641,875

GRINDING WHEEL SPEED REGULATOR

Roy G. Kirby, John M. Morgan, Jr., and Jacob Decker, Cincinnati, Ohio, assignors to The Cincinnati Milling Machine Co., Cincinnati, Ohio, a corporation of Ohio Application September 26, 1951, Serial No. 248,366

6 Claims. (Cl. 51—134.5)

This invention relates to grinding machines and more particularly to mechanism for automatically regulating the speed of the grinding wheel in accordance with decrease in the size thereof. It is well known in the art of grinding that grinding wheels gradually wear away in the course of grinding operations, thereby reducing their diameter, and that further reductions in diameter are effected by the intermittent dressing or truing operations.

Since grinding wheels are usually coupled by a constant speed mechanism to their driving motors, the gradual reduction in the size of the wheel decreases the peripheral speed of the grinding face of the wheel. It is many times desirable, however, that to obtain the best grinding results that the speed of the grinding face remain substantially constant. Attempts have been made in the past at regulating the speed of the grinding wheel, but this has always depended upon the operator to make certain adjustments to accomplish the desired results. By means of this invention the operator does not have to give any thought regarding the speed of the wheel because the adjustment is made automatically each time that the grinding wheel is stopped. This invention contemplates the use of a device which is mounted on a fixed support adjacent the wheel and having a part which will engage the wheel each time it is stopped to ascertain the amount of wheel reduction since the previous determination and automatically effect a change in the speed of the driving motor the next time it is started.

Referring to the drawings in which like reference numerals indicate like or similar parts:

Figure 1 is an elevational view partly in section showing the grinding wheel supporting elements with the speed compensating mechanism mounted on the wheel housing.

Figure 5:
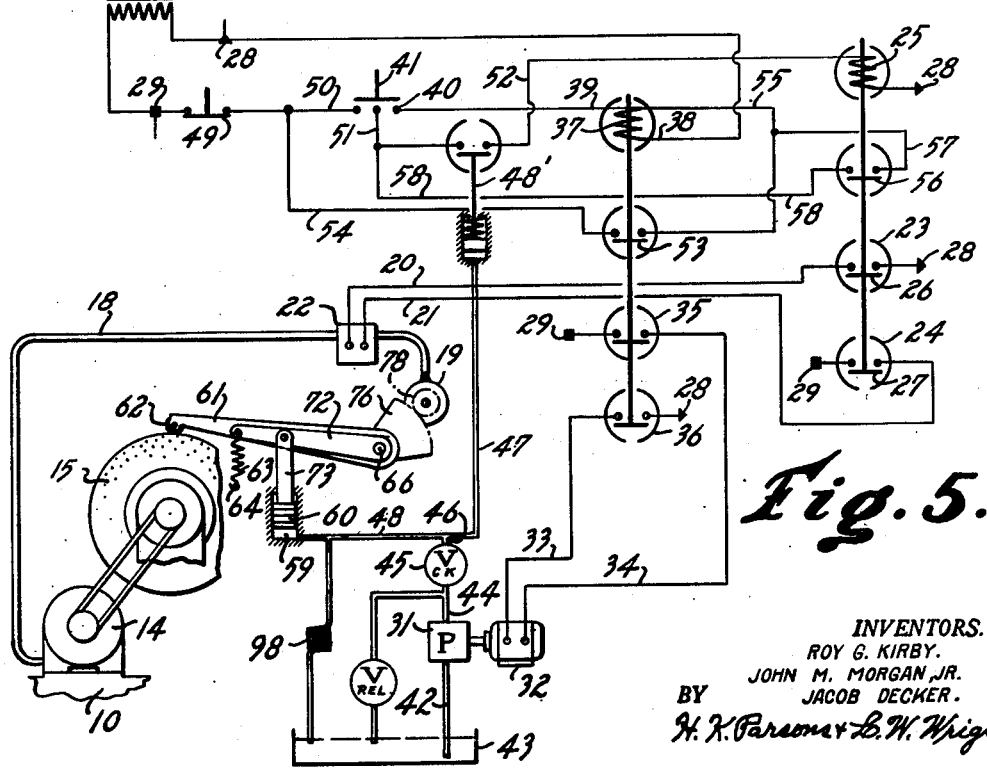

Figure 2 is a view on the line 2—2 of Figure 1.
Figure 3 is a view on the line 3—3 of Figure 1.
Figure 4 is a view on the line 4—4 of Figure 2.
Figure 5 is a diagram of the control circuit.

Referring to Figure 1, the reference numeral 10 indicates generally a grinding wheel spindle housing of conventional design which is slidably mounted on a pair of guideways, one of which is indicated by the reference numeral 11 formed on the bed 12 of a grinding machine. The grinding wheel spindle is indicated by the reference numeral 13, and this may be operatively connected in the usual manner to a driving motor 14 as shown in Figure 5, mounted on the spindle housing 10. One or more grinding wheels 15 are shown attached to the end of the spindle in Figure 1 and clamped thereon between the flanges 16 and 17. Thus, rotation of the spindle will impart rotation to the grinding wheel.

The driving motor 14, shown in Figure 5, is electrically connected by wires contained in the conduit pipe 18 to a rotatable speed control potentiometer 19 whereby the rotatable position of the potentiometer determines the speed of rotation of the motor 14. A pair of wires 20 and 21 extend from the junction box 22 to switches 23 and 24 of a motor starting relay having an operating coil 25. By energizing the relay 25 the switch contactors 26 and 27 close, thereby connecting the line 20 to one power main 28 and the other line 21 to the power main 29. These power mains may receive power from one side of a transformer indicated generally by the reference numeral 30 in the usual manner.

Before the starter relay 25 can be operated, it is necessary that pressure exist in a hydraulic system, part of the oil from which is utilized for lubricating purposes, and part utilized for operating the speed control mechanism. The hydraulic system, shown in Figure 5, has a pump diagrammatically indicated by the reference numeral 31, and this pump is driven by an electric motor 32 which has a pair of leads 33 and 34 extending to starter switches 35 and 36. These switches are closed by a relay coil 37 thereby the lead 34 is connected to the power line 29 and lead 33 is connected to the power line 28. One end 38 of the relay coil 37 is connected to the power line 28. The other end 39 of the relay coil is connected to a contact 40 of a push button starting switch 41. When this switch is closed by the operator, the relay 39 is energized, and the pump 31 is set into operation.

This pump has an intake 42 through which fluid is withdrawn from a reservoir 43 and delivered into a line 44 having a check valve 45 through which the fluid passes into line 46. This line has two branches 47 and 48, the branch 47 leading to a pressure switch indicated generally by the reference numeral 48' whereby when the necessary pressure has been established the switch will close and complete a circuit from the power line 29 through the normally closed stop switch 49, line 50, line 51 which is connected to line 50 by the operator holding the starting switch closed, closed switch 48' and line 52 to the starter relay coil 25 for the grinding wheel motor. On the other hand, however, as soon as the starting switch 41 is closed, a holding circuit is established to the pump starter relay 37, because as soon as it is energized a third contactor 53 is closed by the relay, establishing a holding circuit from the line 50 through the line 54, closed switch 53 and line 55 to the relay 39. When the pump 31 has built up sufficient pressure to close the pressure switch 48, a circuit is established to the motor starting relay 25 as just described, and, in turn, this will close conductor 56, in addition to the switches 23 and 24 and establish a holding circuit for the relay 25 from line 55 through line 57, closed switch 56, line 58 to the closed pressure switch 48' and then through line 52 to the relay 25.

At the same time that pressure is created in the branch 47, pressure is also built up in the branch line 48, and this line terminates in a cylinder 59 having a piston 60 which is operatively connected by means of piston rod 73, arm 72 and shaft 66 to a feeler arm 61. This arm has a roller 62 journaled in the end thereof for contact with the periphery of the grinding wheel. When no pressure exists in the cylinder 59 the roller 62 is normally held in contact with the periphery of the grinding wheel by a spring 63 which has one end attached to the arm 72 and the other end attached to a fixed pin 64. Since it takes more pressure to operate the pressure switch 48' than it does to actuate the piston 60, it will be obvious that the roller 62 will be raised out of contact with the grinding wheel before the wheel is rotated by its driving motor 14. This eliminates wear on the roller.

The feeler arm 61, as shown in Figure 4, is keyed at 65 to operating shaft 66 which is journaled at opposite ends in bearing blocks 67 and 68 secured to supporting plates 67 and 70. These plates are suitably attached to the grinding wheel housing, indicated generally by the reference numeral 71. The arm 72 has a bore 73' by which the arm is mounted on the shaft and the end of the arm is bifurcated as indicated at 74 in Figure 2 by which it may be secured by a clamp screw 75 to the shaft for rotation therewith. This arm is the one that is connected to the piston rod 73 of the piston 60 for imparting rotation to the shaft 66 and the feeler arm 61. The shaft 66 has another arm 76 attached thereto as shown in Figure 4 in the same manner as the arm 72, and this arm is in the form of a gear quadrant, indicated by the reference numeral 77, which meshes with a pinion 78 attached to the potentiometer 19 and imparts rotation thereto upon rotation of the quadrant 77.

Referring now to Figure 3, the shaft 66 has another member attached thereto in the form of a ratchet plate 79. This ratchet plate has a bore and a bifurcated end 80 which intersects the bore so that by means of the clamping screw 81 the ratchet plate may be secured for rotation with the shaft whenever the same is rotated. Referring to Figure 4, a pawl carrier plate 82 is supported for free rotation between the ratchet plate 79 and the bearing block 68 and is held in position by a flanged plate 83 which is secured to the bearing block 68 by screws 84. The pawl carrier plate 82 has a small hole 84' drilled therein, as shown in Figures 3 and 4, and a fixed pin 85 mounted in the bearing block 68 projects into the hole with a limited amount of lost motion. Thus, the plate 82 has a very limited rotation which is determined by the amount of lost motion between the fixed pin 85 and the hole 84. A spring 86 is attached at one end to a pin 87 projecting from the plate 82, and at the other end to an adjusting screw 88 which is threaded in a fixed lug 89 projecting from the plate 70 as shown in Figure 4. By adjusting the tension of the spring 86, the pawl carrier plate 82 may be held in contact with the pin 85.

The plate 82 carries two pawls 90 and 91 which are pivotally mounted on pins 92 and 93 carried by the plate 82. These pawls engage the teeth on the periphery of the ratchet plate 79 and limit the return movement of the ratchet plate. In other words, when the feeler arm 61 rotates the shaft 66 in a clockwise direction, as viewed in Figure 3, the ratchet plate 79 also moves in a clockwise direction until the feeler roller engages the periphery of the grinding wheel. Since the pawl carrying plate 82 cannot move in this direction at this time because of its engagement with the fixed pin 85, the ratchet teeth will slip ahead of the ratchet pawls. However, when the hydraulic pressure is admitted to the cylinder 59 and the piston 60 rotates the shaft 66 in a counterclockwise direction as viewed in Figure 3, the ratchet plate will, through interaction with one or the other of the pawls, cause rotation of the plate 82 by the amount of the lost motion between the fixed pin 85 and the hole 84. The amount of this lost motion determines the distance that the feeler roller will be raised out of engagement with the periphery of the grinding wheel. It will thus be apparent that no matter how far the feeler roller advances in a clockwise direction its return movement will always be limited by the amount of lost motion between the pin 85 and the hole 84.

It is to be noted that the potentiometer will be advanced and retracted with the feeler arm, but due to wear of the wheel this advance movement will be greater than the return movement whereby the potentiometer will be gradually advanced and, as it does so, it gradually increases the speed of the motor and thereby of the grinding wheel.

When the grinding wheel is worn out, and it becomes time to change the wheel, the pawls are moved out of engagement with the ratchet plate by means of an arm 93 which is freely pivoted on the pin 92. By raising this arm it engages pins 94 and 95 projecting respectively from pawls 90 and 91, thereby raising the pawls out of engagement with the ratchet plate. The feeler arm 61 is then raised until a spring latch 96 engages a hole 97 formed in the upper part of the arm 61 and thereby holds it in a raised position. After the wheel has been changed, the arm is released and moved into contact with the periphery of the new wheel.

It will be noted from Figure 5 that the branch line 48 which supplies fluid pressure to the cylinder 59 has a branch resistance coil 98 connected thereto through which oil from the line 48 is bled off to reservoir. The purpose of this is that when the machine is stopped, and the pump 32 shut down, that the oil will not immediately leave the cylinder 59 but will slowly bleed therefrom, thus allowing time for the grinding wheel to coast to a stop before the roller 62 engages the periphery of the wheel.

It is believed that the operation of the mechanism will be clearly understood from the foregoing description and that further description of the operation of the device is not necessary.

There has thus been provided an improved mechanism for automatically controlling the speed of the grinding wheel as it wears down without attention from the operator and that the peripheral face of the wheel will be maintained at a satisfactory speed throughout the life of the grinding wheel.

What is claimed is:

1. In a grinding machine having a variable speed motor for driving the grinding wheel spindle of the machine, the combination of adjustable speed control means for said motor including a feeler arm movable into and out of engagement with the face of said wheel, a stop mechanism for limiting the retrograde movement of said arm including a ratchet plate rotatable with said arm, and stop pawls engageable with said plate for limiting the retrograde movement of said arm.

2. In a grinding machine having a grinding wheel spindle supporting a grinding wheel for rotation thereby, the combination with a variable speed motor for rotating said spindle at prescribed rates in accordance with the diameter of said wheel, of rate control means for determining the speed of said motor, a feeler arm operatively connected to said rate control means and supported for movement toward and from the periphery of the grinding wheel, spring means for moving said arm into engagement with said wheel, and power operable means for disengaging said arm whenever the motor is energized.

3. In a grinding machine, the combination of means for regulating the speed of the grinding wheels in accordance with the diameter thereof including a feeler arm for engaging said wheel, means normally holding said arm in engagement with said wheel, a power operable motor for rotating said wheel including a control circuit energizable for starting said motor, and means responsive to energization of said circuit to effect disengagement of said arm from the grinding wheel before the motor begins rotation.

4. In a grinding machine, the combination of means for regulating the rate of rotation of the grinding wheel in accordance with the diameter thereof including a power operable motor for rotating said wheel, rate control means for said motor settable by a feeler arm normally in engagement with said wheel when the motor is stopped, power operable means to effect disengagement of said arm, a control circuit for energizing said power operable means and said motor, stop means for limiting the disengaging movement of said arm and thereby determining the setting of said rate control means, and means responsive to deenergization of said circuit for delaying return of said arm until the grinding wheel has stopped.

5. In a grinding machine having a grinding wheel spindle supporting a grinding wheel for rotation thereby, the combination with a variable speed motor for rotating said spindle to impart a predetermined peripheral speed to said grinding wheel, of a potentiometer operatively connected for determining the speed of said motor, a feeler arm movable into engagement with said wheel and operatively connected to said potentiometer for positioning thereof in accordance with movement of the arm, fluid pressure control means automatically operable to move the arm out of engagement with said wheel and set said potentiometer, a starting switch for said motor operable by said fluid pressure means to actuate said motor at the speed set by said potentiometer, and means to release said fluid pressure means to stop the motor and return the arm into engagement with said wheel.

6. In a grinding machine having a motor for effecting rotation of the grinding wheel thereof, the combination with a rate control means for said motor, of a feeler arm connected to said rate control means and movable into and out of engagement with said grinding wheel, fluid pressure control means for automatically moving the arm out of engagement with said wheel, a starting switch for said motor operable by said fluid pressure means to effect actuation of said motor, a ratchet stop mechanism operatively connected to said arm for limiting the retrograde movement of said arm to a predetermined amount and thereby the motor speed setting of said rate control means whereby when the advance movement of said arm is greater due to wheel wear than the constant retrogade movement, the rate control means will be automatically adjusted to increase the rate of rotation of said motor.

ROY G. KIRBY.
JOHN M. MORGAN, Jr.
JACOB DECKER.

References Cited in the file of this patent

UNITED STATES PATENTS

| Number | Name | Date |
| --- | --- | --- |
| 766,229 | Douglas | Aug. 2, 1904 |
| 2,056,871 | Silven | Oct. 6, 1936 |
| 2,302,304 | Elberty | Nov. 17, 1942 |
| 2,545,730 | Fouquet | Mar. 20, 1951 |